(12) United States Patent
Qi et al.

(10) Patent No.: US 7,822,852 B2
(45) Date of Patent: Oct. 26, 2010

(54) METHOD FOR ADAPTIVELY MODIFYING THE OBSERVED COLLECTIVE BEHAVIOR OF INDIVIDUAL SENSOR NODES BASED ON BROADCASTING OF PARAMETERS

(75) Inventors: Han Qi, Irvine, CA (US); Inseok Hwang, Gimpo-si (KR); Archan Misra, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/061,388

(22) Filed: Apr. 2, 2008

(65) Prior Publication Data
US 2008/0209026 A1    Aug. 28, 2008

Related U.S. Application Data

(63) Continuation of application No. 11/139,717, filed on May 27, 2005.

(51) Int. Cl.
*G06F 15/173*    (2006.01)
*G08C 19/04*    (2006.01)

(52) U.S. Cl. .................................. 709/224; 340/870.11
(58) Field of Classification Search ................. 709/224, 709/223; 340/870.11
See application file for complete search history.

(56) References Cited

U.S. PATENT DOCUMENTS 5,159,547 A * 10/1992 Chand ......................... 700/37

| 7,055,148 | B2 | 5/2006 | Marsh et al. |
| 7,295,960 | B2 * | 11/2007 | Rappaport et al. ............. 703/13 |
| 7,346,672 | B2 * | 3/2008 | Harvey, IV .................. 709/221 |
| 2004/0066313 | A1 * | 4/2004 | Ong et al. .............. 340/870.11 |
| 2005/0065632 | A1 * | 3/2005 | Douglis et al. .............. 700/200 |
| 2006/0003747 | A1 * | 1/2006 | Kolakowski ............. 455/414.1 |

OTHER PUBLICATIONS

The Self-Protection Problem in Wireless Sensor Networks, Author: Dan Wang, Qian Zhang, Jiangchuan Liu ACM Transactions on Sensor Networks, vol. 2, No. 3, Sep. 2001 http://www.cs.sfu.ca/~jcliu/Papers/SP-Journal-final.pdf.*

(Continued)

*Primary Examiner*—Benjamin R Bruckart
*Assistant Examiner*—Noel Beharry
(74) *Attorney, Agent, or Firm*—Yee & Associates, P.C.; Anne V. Dougherty

(57) ABSTRACT

A method for continually controlling the collective behavior of a set of computing devices in a distributed data processing system. A gateway node disseminates a specification request comprising a set of parameters to a set of computing devices. The gateway node may be unaware of the number and identity of individual computing devices. Each computing node receiving the request determines whether its attributes satisfy the predicates expressed in the specification request. If so, the node processes the parameters in the specification request and modifies its own behavior based on the values in the parameters of the specification request. Subsequently, the gateway node may also observe the quality of information (QoI) values communicated from the set of computing devices. The gateway node iteratively modifies the parameters disseminated in subsequent specification requests based on a divergence between a computed quality of information value and a desired quality of information value.

25 Claims, 3 Drawing Sheets

OTHER PUBLICATIONS

Point-to-Multipoint Communication Protocol PTMP, Author: Tsutomu Kawai, Joutarou Akiyama, Minoru Okada, Information Networking, 1998 pp. 646-651 http://ieeexplore.ieee.org/search/srchabstract.jsp?arnumber=648588&isnumber=14138&punumber=5232&k2dockey=648588@ieeecnfs&query=%28%28point-to-multipoint+communication+protocol+ptmp%29%3Cin%3Emetada.*

Model-Driven Data Acquistion in Sensor Networks, Author: Amol Deshpande, Carlos Guestrin, Samuel R. Madden, Joseph M. Hellerstein, Wei Hong Proceedings of the Thirtieth Internation conference on Very Large Data Bases—vol. 30, Toronto Canado, Pub: 2004 http://portal.acm.org/citation.cfm?id=1316741.*

The Wakeup Problem in Synchronous Broadcast Systems, Author: Leszek Gasieniec, Andrzej Pelc, David Peleg Annual ACM Symposium on Principales of Distributed Computing, Portland Oregon, Pub: 2000 http://portal.acm.org/citation.cfm?id=343477.343529&coll=GUIDE&dl=GUIDE&CFID=11789419&CFTOKEN=54125248.*

* cited by examiner

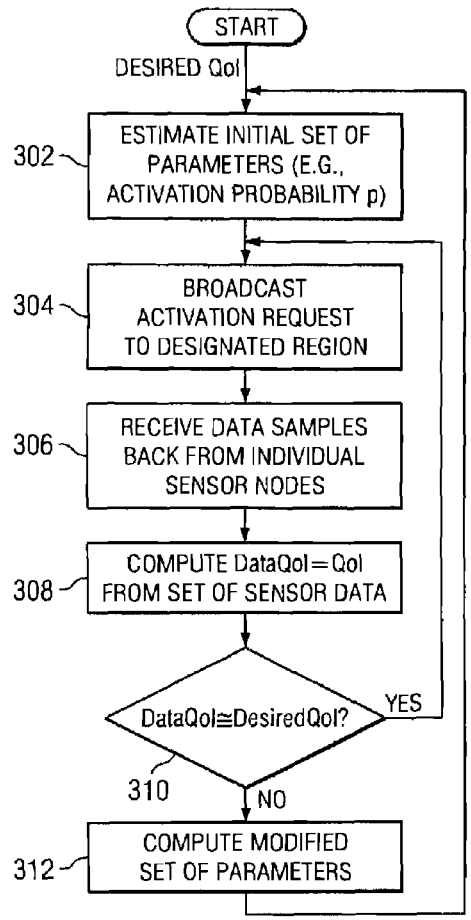
FIG. 3
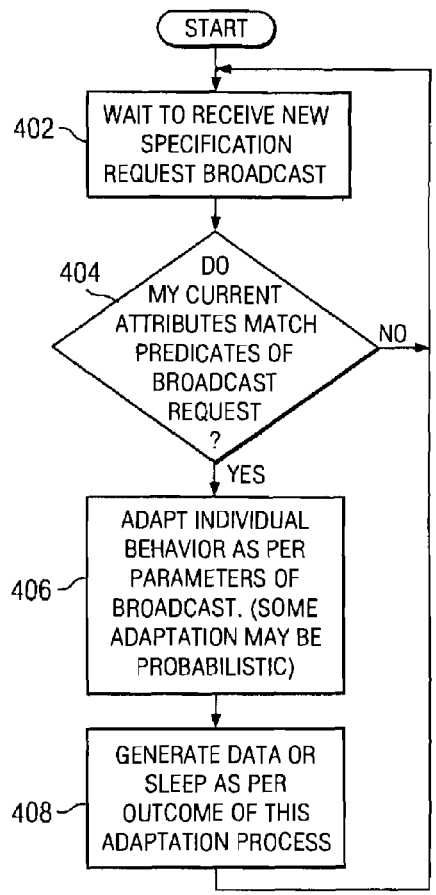
FIG. 4
FIG. 5
```
□ <sensor-query>
   - <id>1179</id>                              502
   - <sequence>3</sequence>                     504
   - <type>thermal</type>                       506
   - <region>(100, 200,500,500)</region>        508
   - <period>30</period>                        510
   - <samestream>0</samestream>                 512
   - <duration>600</duration>                   514
   - <psrp>0.6</psrp>                           516
□ </sensor-query>
```
500

METHOD FOR ADAPTIVELY MODIFYING THE OBSERVED COLLECTIVE BEHAVIOR OF INDIVIDUAL SENSOR NODES BASED ON BROADCASTING OF PARAMETERS

This application is a continuation of application Ser. No. 11/139,717, filed May 27, 2005, status pending.

BACKGROUND OF THE INVENTION

1. Field of the Invention

The present invention relates generally to computer and communications networks, and more specifically to the emerging field of "sensor networks", typically consisting of a large number of individual "sensor" devices, which send back samples of some environmental state to certain designated nodes.

2. Description of the Related Art

Sensor networks are an emerging and very promising new category of computer networks, characterized by the development of very-low cost sensor devices with combined sensing and communication (often wireless) capabilities. Most applications of sensor networks rely on combining information from multiple sensor devices to establish or infer some composite state or event of the sensed environment (often called the "sensing field"). Examples include the desire to "compute an average of readings taken by 10 different temperature sensors," or to "compute the minimum out of 30 distinct humidity sensor readings." Scalability is a major technical challenge in such future networks, which are projected to contain thousands, and possibly hundreds of thousands, of tiny sensor nodes deployed fairly densely over the sensing field. A key characteristic of many such operating environments is that such networks often exhibit significant redundancy, in that most applications do not normally require the use of sensor data from all of the available sensor nodes. Indeed, the physical density of sensor networks may often vary greatly over the sensing field due to choice (e.g., network designers may deploy more nodes in an area where finer location accuracy is required), lack of precise control (e.g., when nodes over a remote terrain are deployed by being dropped from an airplane), or failures (e.g., when sets of sensor nodes turn out to be defective or die due to exhaustion of battery resources). Clearly, if the requirements of the application can be met by activating only a subset of the available nodes, significant energy savings in the operation of the network can be obtained. In sensor network environments, where the energy resource of a node is often battery-based, judicious activation of the appropriate fraction of available nodes can significantly extend the overall operational "lifetime" of the network.

The notion of redundant deployment can manifest itself in forms other than simply the number of nodes of a designated type. For example, one can imagine a remote monitoring scenario involving an array of video cameras with zoomable lenses, placed one foot apart. In normal mode, it may be adequate to operate only one out of 50 cameras, with each activated camera operating at low zoom and covering a wide 3-D angular cone. Subsequently, if the application detects some potential motion via any one camera (using sophisticated image analysis and motion detection algorithms), the application may then request every alternate camera in the corresponding region to be activated, such that each camera operates at relatively high zoom and provides a very high resolution image for further analysis (e.g., to detect whether the motion is due to a wild animal or a malicious intruder). The important conclusion from these examples is that redundancy may occur not just in terms of the raw number of sensor nodes activated, but also in terms of various operational attributes of the activated nodes (e.g., the zoom factor of the video sensors). Significant benefits, such as increased operational lifetime and decreased traffic load, accrue even in cases where all nodes are "active", but operating only at the "level" required to meet the application's "quality of information" (QoI) requirement. For example, another alternative to the monitoring scenario mentioned above would be to have all cameras activated, with each camera only transmitting, say $1/10^{th}$ of its composed image (corresponding to a small portion of the total area captured by its lens), to a central processing facility. In this manner, by saving on the cost of transferring high-bandwidth images over the wireless channel, individual sensor nodes may realize significant energy savings.

The main challenge in supporting such energy-efficient operation is that, while applications may be able to express the amount of resources (such as the number or resolution of the sensor nodes), they typically have no idea of the actual number or layout of the sensors deployed. Accordingly, an application may not be able to decide on the appropriate settings (e.g., on or off, high or low zoom) for each individual sensor. The current practice for solving similar parameter configuration problems in conventional networks (wired or wireless) is to assume that there is a central database that contains an up-to-date information network identifier, as well as relevant attributes (such as location, degree of zoom, etc.), of each deployed sensor node. Assuming that such a central repository is available, then there are a variety of state-of-the art algorithms (based on techniques such as maximum set cover heuristics, etc.) for computing exactly which resources should be activated, as well as the appropriate setting of the parameter on these resources. After the settings are computed, they are communicated to the targeted network node, by using the explicit network identifier (e.g., IP address or DNS host name) of the network node.

However, such a mechanism is not useful in future sensor network environments for two distinct reasons. First, the approach requires a central repository (or an intermediate middleware layer) to be aware of the precise topology of the network, and the identifiers of each of the sensor nodes. More importantly, to ensure correct configuration of individual nodes, the repository must be continually updated of dynamic changes to the network topology or node properties. For example, the sensor network substrate can be modified either due to the occasional addition of new nodes, the death or removal of existing nodes and due to other unforeseen reasons (such as catastrophic node failures). This imposes a substantial reporting overhead and cannot scale to large sensor network environments, since every such change in the network topology must be propagated to the database. If a static configuration scheme is employed instead, it may quickly become inappropriate for the given operating environment. For example, suppose that 100 temperature nodes are specifically activated to meet the application's QoI requirement. However, if subsequently 50 nodes suffer a catastrophic failure (e.g., due to a natural disaster), the application will be left only with data from the remaining 50 nodes. In other words, the QoI obtained has become closely coupled to the dynamics of the underlying sensor network.

Second, this approach assumes that each sensor node is individually addressable, so that appropriate configuration parameters may be transmitted to it. In reality, many of the sensor nodes will not have the software stack typically associated with more powerful networked devices (such as cell phones or laptops). In many cases, for example, the nodes may not have IP addresses and may not be individually addressable. Indeed, there is a very active body of research in the sensor network academic community centered on forms of content-based addressing. In this approach, commands or queries are issued to groups of sensors possessing appropriate attribute values (e.g., a query for all sensors whose type="temperature" and location="cityA"). The query is typically propagated over a region of interest, and processed by all sensors in that region that have attributes satisfying the predicates of the query.

Recent work in the area of sensor networks (e.g., C. Intanagonwiwat, R. Govindan, and D. Estring, "Directed Diffusion: A Scalable and Robust Communication Paradigm for Sensor Networks", Proceedings of ACM MOBICOM, 2000 (hereinafter "Directed Diffusion"); W. Heinzelman, J. Kulik, and H. Balakrishnan, "Adaptive Protocols for Information Dissemination in Wireless Sensor Networks", Proceedings of 5th ACM/IEEE MOBICOM Conference, Seattle, Wash., August, 1999; N. Jiang, C. Schmidt, V. Matossian, and M. Parashar, "Enabling Applications in Sensor-based Pervasive Environments", Proceedings of $1^{st}$ Workshop on Broadband Sensor Networks (BaseNets), Oct. 29, 2004 (hereinafter "Associative Rendezvous"); etc.) has focused on ways to efficiently propagate the query over the appropriately defined sub-region of the sensing field, rather than the simple-minded approach of broadcasting it over the sensing field. Although all of these techniques define "how" some queries or requests are propagated over the sensing field, these techniques do not define "what" is propagated or how individual nodes respond to the "what" they receive. Moreover, they do not define or provide an adaptive method by which the "what" (i.e., the content) may be used to continually meet the QoI requirements of the application, even though the topology and other physical properties of the sensor network changes.

As previously mentioned, the idea of using broadcasts or "directed broadcasts" to communicate implicitly with a group of computer nodes has been presented in research literature in several forms. Directed Diffusion (DD) presents one example of directed broadcast, where the query or application request for data is initially broadcast over the entire network. Subsequently, some of the paths are reinforced and others pruned to establish a reasonably optimal delivery path from the source of the data to the sink (the gateway node that issued the query). In directed diffusion, the query is issued without being explicitly aware of the identity of sensor nodes that would respond as data sources for the query. However, DD does not provide a method by which the application's QoI requirements can be met by iteratively issuing directed broadcasts, with modifications to the parameters contained in the broadcast.

Associative Rendezvous (AR) is another technique for matching application queries with corresponding sensor data. The AR technique is based on the publish-subscribe paradigm, with gateway nodes publishing requests for data, and sensor nodes advertising availability of the appropriate type of data. As both the request and advertisements conform to well-known schemas, they can be matched at intermediate "rendezvous" nodes which can then route the data from the sensor sources to the sink (the controller). However, like DD, the AR technique does not propose the use of an iterative mechanism to match the amount and quality of sensor data to an application's QoI requirements, thereby avoiding redundant operation of sensor nodes.

There are some examples of using probabilistic mechanisms to control the behavior of individual sensor nodes in the sensor network literature. The key idea in all these approaches is to define a certain probability with which each individual sensor node performs a certain task or assumes a certain role. Once this probability is defined, each sensor node switches to this task or role with the appropriate probability. However, all of the proposals and prior art in this domain deal with mechanisms by which nodes get to know of this probability, and not with methods by which such probabilities can be used to iteratively control the collective behavior of a set of sensor nodes. The problem of broadcasting single messages to all nodes in a sensor or ad-hoc network using probabilistic mechanisms has been studied in S. Y. Ni et al, "The Broadcast Storm Problem in a Mobile Ad Hoc Network", Proceedings of MOBICOM 1999 (hereinafter "Ni") and W. Peng and X. Lu, "On the Reduction of Broadcast Redundancy in Mobile Ad Hoc Networks", Proceedings of ACM MOBIHOC, 2000 (hereinafter "Peng"). The fundamental idea is that each node that receives the packet re-broadcasts it with a certain probability. Ni and Peng include mechanisms for computing in off-line fashion this probability as a function of the network node density so as to ensure that all nodes most certainly receive the message, while avoiding redundant retransmissions. However, these approaches do not utilize a control loop for adjusting the probability to the "right level" desired by the controller, and do not talk about using the probabilities or other parametric values to adjust other behavioral parameters (such as data reporting frequency or camera zoom level) of a subset of the sensor nodes.

LEACH is another approach that uses probabilistic activation of nodes in a sensor network, with the goal of keeping a certain pre-determined fraction of the nodes awake (to aid in packet routing) as described in W. Heinzelman, P. Chandrakasan and H. Balakrishnan, "An Application-Specific Protocol Architecture for Wireless Micro-sensor Networks", IEEE Trans. on Wireless Communications, Vol. 1, 2002. In LEACH, each node independently chooses to become active or to sleep with a pre-designated probability value "p". Moreover, nodes that have been active in the recent past modify their activation probability to be lower than p. In this way, the protocol ensures that over a suitably long timeframe, the job of remaining active for routing is distributed across all the nodes in the network and that no particular node faces energy depletion much faster than other nodes in the network. However, in LEACH, there is no notion of a control loop being used by a gateway node to dynamically tune the value p to ensure that it meets a target value N. Moreover, LEACH does not utilize broadcasts from a gateway node that are targeted to a specific sub-set of the sensor nodes (identified for example by the type or location of the sensor nodes) to activate varying numbers of sensors with different attributes (e.g., type or location).

Techniques for estimating the correct activation probability needed to ensure a certain level of spatial coverage, given a specific node density, are described in Y. Gao, K. Wu and F. Li, "Analysis on the Redundancy of Wireless Sensor Networks", Proceedings of ACM WSNA, 2003. These approaches assume that the node density is uniform and known a-priori, and analyze how different activation probabilities impact the "degree of coverage". They do not provide a method of dynamically controlling the activation probabilities without knowing the node density (and for non-uniform node densities), or discuss a broadcast-based technique to activate the right number of sensors without addressing them individually.

Finally, an alternative approach, called Broadcast Based Query (BBQ), is based on statistical learning to avoid the redundant communication of data value samples from a set of sensor nodes to a sink node, as described in A. Deshpande, C. Guestrin, S. Madden, J. Hellerstein, and W. Hong, "Model-Driven Data Acquisition in Sensor Networks", Proceedings of VLDB, 2004. This approach assumes that applications specify their QoI requirements on the basis of statistical parameters, such as confidence intervals, on the data. A middleware component is then defined that initially collects samples from all the sensors and builds up a model of the correlation among the data from the various sensor sources. After the learning phase is over, the middleware can then compute an efficient sequence in which the sensor data sources should be sampled, potentially altering the sequence or even terminating the sampling process if the current samples provide enough statistical confidence on the values that the other (unsampled) sensors might have. While this approach can prevent the retrieval of redundant sensor data, it works only when the set of sensor nodes, and their associated attributes, remain fixed for all time. The BBQ approach does not employ a closed loop model that can adapt to dynamic changes in the underlying network; nor does it propose that the behavior of individual sensor nodes be modified (in response to such dynamic changes) to ensure collective conformation to an application's QoI requirements.

Thus, it would be advantageous to have a data gathering framework that allows for adaptively modifying the observed collective behavior of individual sensor nodes based on broadcasting of parameters. It would further be advantageous to have a mechanism for adapting sensor node behavior to the extent needed to satisfy an application's QoI requirements, without requiring explicit knowledge of the identity, number, or properties of individual nodes, even though the underlying sensor network may dynamically change over time.

SUMMARY OF THE INVENTION

One aspect of the invention is a method, apparatus, and computer program product for a gateway node or entity to regulate the collective behavior of individual nodes by simply broadcasting or otherwise publishing parameters to control the behavior of individual nodes, without being aware of the identity or even number of available sensor nodes. In this approach, the gateway node specifies in a structured format the values for parameters for one or more types of sensor nodes. For example, the gateway node may specify an activation probability (the probability with which a sensor node will remain active and report back samples), a sample time period, the level of zoom or the bit-resolution of each individual data sample reported back, and/or a region (expressed in some coordinates) over which it is interested in receiving data. This specification may then be distributed using various point-to-multipoint packet distribution techniques, such as broadcasting, multicasting, or data diffusion, over the entire sensor network or the specified region of interest. Each individual sensor node that is targeted by this specification (for example, all sensors that correspond to the designated type) will appropriately adapt their behavior using the parameters received in the specification broadcasts. For example, if the specification includes an activation probability "p", each sensor will effectively remain in an active state (sensing and transmitting samples) with probability p, and will transition to a "sleep" state with probability 1−p. A related aspect of this invention is that the individual sensor nodes simply adjust their individual behavior, and do not need to coordinate their activity with other "peer" sensor nodes.

Yet another aspect of this invention is a method, apparatus, and computer program product for controlling the aggregate behavior of a group of sensor nodes, based on the technique of having a gateway node issue specification requests broadcast to a group of sensor networks, followed by observation and monitoring of some function of the data (whose output may be described as Quality of Information (QoI)) resultantly retrieved from the network. Based on the estimation of the discrepancy between the desired QoI and the QoI derived from the data samples obtained from the network, the gateway node will subsequently issue additional specification requests with modified parameters. This process is iteratively and continually carried out until the data retrieved from the network satisfies, or is a close approximation to, the QoI bound desired by an overlying application. Such a control-loop based adjustment of the parameters broadcast in activation requests is a unique feature, as it allows the gateway node to "tune" the behavior of individual nodes simply on the basis of the observed output (i.e., the data retrieved from the sensor network). The present invention does not require the gateway node network to be aware of the specific details, such as the network topology or the node density, of the underlying network. In one embodiment of the present invention, the gateway node may simply desire to control the number of sensor nodes actively reporting data in a specified region, with the intent of avoid unnecessary activity from additional (redundantly deployed) nodes. For example, assume that the gateway node requires readings from N nodes, while in reality, the region has S nodes. In one embodiment of the present invention, the gateway node may initially simply broadcast an activation probability "p" with an initial value of "pinit" to the nodes. Assuming that each node activates itself with this probability, the gateway node will observe readings from approximately "S*pinit" distinct sensors. If S*pinit is larger than the target value N, the gateway node will simply adjust "p" to a new value larger than pinit. Alternatively, if S*pinit turns out to be smaller than N, the gateway node may increase p to a value larger than pinit. Thus, through an iterative application of this process, the gateway node may ensure the activation of approximately N nodes, without being explicitly aware of the real number of deployed nodes.

Another aspect of this invention relates to the continual monitoring of the QoI obtained from the activated set of sensors, and the subsequent adjustment of the parameters in subsequent specification requests. Clearly, such continual monitoring allows the gateway node to rapidly re-tune the behavior of the sensor network and maintain conformance to the target QoI objective, even though the underlying sensor network may change dynamically. To make the convergence process faster, the gateway node may maintain some "state" that it infers about the current network resources, and make the adjustment of parameters a function of this estimated "state". Many well-known techniques from control theory, such as Proportional-Integral-Derivative (PID) control, Kalman filtering, or fuzzy control, may be used for this purpose. The mechanism of the present invention may employ any closed loop control technique for rapid adaptation of individual sensor node behavior. As a continuing example, after the activation probability p has converged to approximately N/S, let us assume that some catastrophic event causes the number of available sensors to suddenly drop to N/2. At this point, the gateway node will observe a rapid drop in the number of distinct sensors reporting data, and may then rapidly adjust the probability to a higher value, so that a higher proportion of the available sensor node population is activated to meet the desired QoI of the application.

One further aspect of this invention is the use of a set of special bits or flags in the specification requests to indicate whether the present request should be processed by each node, or whether the specification request should only be processed by nodes whose parameters presently satisfy a stated constraint. This set of flags provides some form of memory or correlation between consecutive sets of specification requests, even though each specification request is treated independently by the receiving sensors. For example, if a "persistence" flag is set to "true" and the activation probability p=0.6, this implies that nodes that are currently active continue to stay active, while nodes presently inactive switch to an active state with 0.6 probability. Conversely, if this flag is set to "false", then all nodes independently switch to active state with probability 0.6. Clearly, the persistence flag is useful if the gateway node wants to ensure that a certain set of nodes continue to report on data (e.g., this may be achieved by sending a request with persistence flag=false and p=0.0). If the persistence flag is set to false, the gateway node will receive reports from completely randomly chosen subsets of the available sensor nodes across consecutive specification requests.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a flowchart of an exemplary process by which a gateway node may continuously adapt the specified parameters for sets of sensor nodes and thereby ensure that the application-specified QoI constraint is met (within some specified bound) in accordance with a preferred embodiment of the present invention;

FIG. 4 is a flowchart of an exemplary process at an individual sensor to utilize specification broadcasts and locally adapt its behavior in accordance with a preferred embodiment of the present invention;

FIG. 5 shows a sample description of the contents of a specification broadcast in accordance with a preferred embodiment of the present invention;

DETAILED DESCRIPTION OF THE PREFERRED EMBODIMENT

Figure 1:
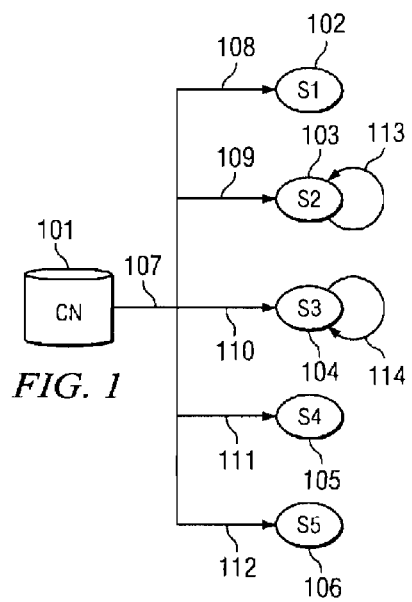
FIG. 1 shows an exemplary sensor network environment, illustrating the broadcasting of an "activation request" from a gateway or controller node to a set of sensor nodes, and the subsequent adjustment of sensor node behavior in response to the content of the broadcast, in accordance with a preferred embodiment of the present invention.

The present invention provides a "closed loop" control mechanism for continually maintaining the Quality of Information (QoI) requirements of an application, while avoiding the unnecessary activation of additional available nodes or the redundant setting of node parameters. The mechanism of the present invention provides a gateway node for propagating an initial set of parameters for an implicitly specified group of sensor nodes, without being directly aware of the presence or absence of individual nodes in that group. The parameters may define initial values of the content (initial values of "what") that are propagated to remote sensor nodes in the field. The gateway node then iteratively continues to monitor the QoI that results from prior parameter settings, and alters the settings (future values of "what") to try to attain the QoI objective. As a result of this continual monitoring and adjustment of propagated parameters, the mechanism of the present invention may ensure that the resulting sensor data continues to conform to the QoI objective (at least, whenever adequate resources are available) by compensating for any dynamic change in the underlying network. More importantly, this compensation is achieved without any actual knowledge of the changes in the network. Unlike current techniques, the present invention does not require the network to continually provide updates on lower-level changes in the network topology or resource levels.

Accordingly, by using this adaptive mechanism, the QoI of the data obtained by the application can be effectively decoupled from the dynamic variations in the underlying sensor network. Moreover, this decoupling is achieved through a very simple model of adaptation at each sensor node—each sensor node only alters its own settings in response to the commands/queries propagated by the gateway node, without any mandatory interaction with any other sensor node. Accordingly, from the standpoint of an individual sensor device, this approach is much simpler than alternative schemes (such as clustering, in-network aggregation etc.) that require complicated distributed interaction with other "peer" or "hierarchical" sensor nodes.

The present invention is particularly beneficial in scenarios where an application typically utilizes data from a set of sensor nodes, rather than relying purely on a single specifically addressed sensor node. In addition, the present invention may ensure that data obtained from an appropriate subset of the available set of sensor nodes is adequate to meet some designated "quality of data," without being directly concerned about the specific identity of individual sensors that provide pieces of the data. Examples of application requests include requests to obtain "readings from 10 distinct temperature sensors located in a particular physical grid," or "readings from enough humidity sensors to ensure that the standard deviation of the sample set does not exceed 5."

With the present invention, a designated control node uses a control loop that broadcasts or otherwise disseminates certain operational parameters over the sensor network, without being explicitly aware of the network identity, the number or the topological layout of individual sensor nodes. This method of "broadcast-based dissemination" is particularly useful for wireless sensor networks, since well-known mechanisms exist to broadcast packets to nodes over the wireless medium in a single transmission without explicit awareness of their network identifiers. The mechanism of the present invention requires only a simple response mechanism at an individual sensor node, such that every node receiving this broadcast information may independently modify its individual behavior, without any interaction with other sensor nodes. This modified behavior may include one of a sensing behavior or communications behavior, or a combination of both. The central gateway node observes the resulting collective behavior of the sensor nodes, and may then alter the values of operational parameters in subsequent broadcasts to "tune the network." In particular, the continuous observation of received sensor values and the adjustment of parameters in future broadcasts allows the gateway node to adjust the activity level of the sensor nodes in the face of dynamic changes caused, for example, due to new sensors being deployed or sensors "dying" due to battery exhaustion or radio failure.

The present invention may be used in any scenario where the application requirements are specified only in terms of QoI values. By iteratively adjusting the parameters of the individual sensor nodes in the network such that the composite data from the sensor nodes meets these QoI requirements, the present invention ensures that an appropriate level of sensor network resources are used without any specific knowledge of the network topology. Moreover, the mechanism of the present invention maintains conformity to the QoI requirements, even if the underlying network topology or the attributes of one or more sensor nodes dynamically change. Accordingly, a key benefit of the present invention is that it decouples the quantity and quality of the data retrieved from the potentially time-varying sensor network deployment. Moreover, by adjusting the parameters of individual sensor nodes only to the extent needed to satisfy the QoI requirements, the present invention provides for energy-efficient sensor network operation, especially when the network has redundant resources. The mechanism of the present invention may be utilized in all application domains that utilize data from groups of sensor nodes, such as, for example, remote surveillance, environmental monitoring, highway observation and forest-fire detection.

The following description details how the present invention is employed to first, dynamically identify the set of user or device identifiers that satisfy various contextual predicates, and subsequently, establish a collaborative association between these user or device identifiers. Throughout the description of the invention reference is made to FIGS. 1-7. When referring to the figures, like structures and elements shown throughout are indicated with like reference numerals.

FIG. 1 is an exemplary block diagram of a distributed data sensing system according to the present invention. In particular, FIG. 1 shows an exemplary environment embodying the basic steps of "activation request" broadcast based control of sensor nodes. As shown, the distributed data sensing system 100 may include the transmission of broadcast data over one or more hops, via a combination of broadcast and unicast messages (e.g., transmissions 108-112), to one or more sensors such as sensors S1 102, S2 103, S3 104, S4 105, and S5 106, and a gateway node (GN) 101.

The actual transmission of data over the medium may use various types of communication links, with or without native broadcast support, between the various devices and computers connected together within distributed data processing system 100. The one or more packet transmissions 108-112 may use any type of network capable of conveying information between gateway node 101 and sensors 102-106. The one or more packet transmissions 108-112 may be performed over a variety of links, such as wired communication links, wireless communication links, satellite communication links, cellular or similar radio based communication links, infrared communication links, fiber optic cables, coaxial cables, and the like.

The broadcasting of packet transmissions 108-112 may be performed over a local area network (LAN), wide area network (WAN), intranet, satellite network, infrared network, radio network, cellular telephone network or other type of wireless communication network, the Internet, and the like.

Gateway node 101 regulates the behavior of the sensor nodes 102-106. Initially, broadcast request 107 is created and transmitted 108-112 to the sensor nodes, wherein the broadcast request indicates the parameter settings for individual nodes in the target region. For example, assume that sensors S1 102, S2 103, S3 104, S4 105, and S5 106 are all in the target region. The specification request is then broadcast or otherwise communicated (e.g., via 108, 109, 110, 111 and 112) to each of the individual sensor nodes S1 102, S2 103, S3 104, S4 105, and S5 106, respectively, using the appropriate communication technology. Based on the received specification request, each sensor node individually adapts its behavioral parameters, such as the sensor's activation probability or sample reporting probability. For example, the specification broadcast in FIG. 1 may include an activation probability "p". In this case, each of the sensors will individually choose to activate themselves for the appropriately defined interval with probability p. In this example, nodes S2 103 and S3 104 probabilistically switch, 113 and 114 respectively, to an active state, while the other sensors continue to remain inactive.

Figure 2:
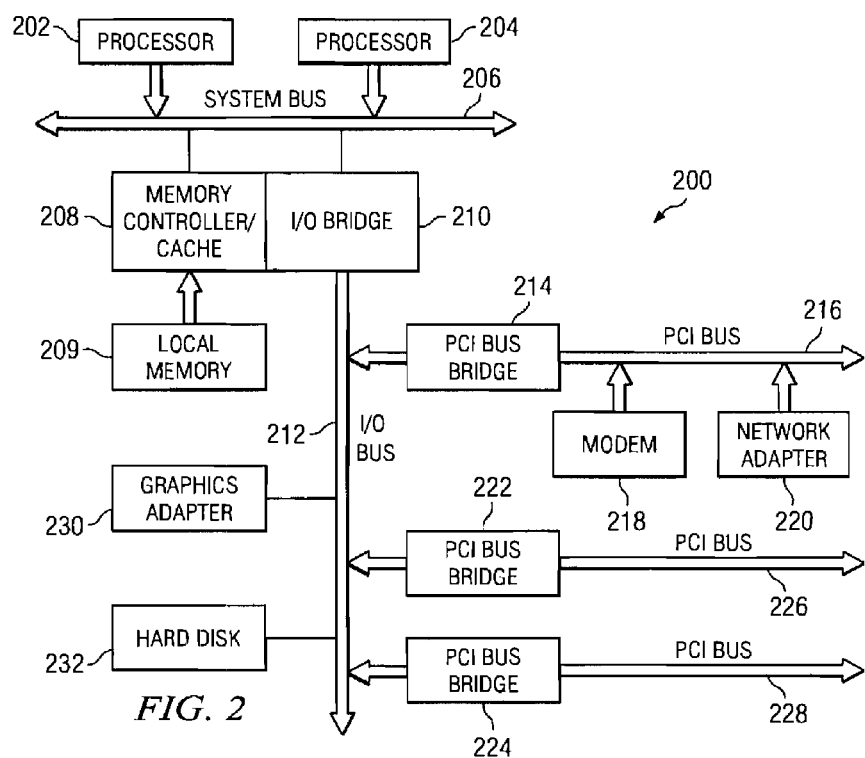
FIG. 2 is a diagram illustrating a computing device in which the exemplary aspects of the present invention may be implemented.

FIG. 2 is a diagram illustrating one type of computing device in which exemplary aspects of the present invention may be implemented. The computing device shown in FIG. 2 may be implemented as the gateway node shown in FIG. 1. As shown in FIG. 2, data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Those of ordinary skill in the art will appreciate that the processes of the present invention are capable of being distributed in the form of a computer readable medium of instructions that may be stored in local memory 209 and executed by processors 202 and/or 204. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly. Local memory 209 and hard disk 232 are examples of computer readable media.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention and is only offered as an example computer architecture in which aspects of the present invention may be implemented. Computer architectures are quite widely varied and any computer architecture that would facilitate the functions of the present invention being performed is intended to be within the spirit and scope of the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Turning now to FIG. 3, a flowchart of an exemplary process by which the gateway node may continuously adapt the specified parameters for sets of sensor nodes and thereby ensure that the application-specified QoI constraint is met (within some specified bound) is shown. The process described in FIG. 3 may be implemented in a gateway node, such as gateway node 101 in FIG. 1.

The process begins with the gateway node initially creating a set of specification parameters (step 302). The initial values of the specification parameters may be based on static policies, long-term observed behavior, or may be a configuration setting. These specification parameters are obtained from an overlying application, and comprise an appropriately defined target QoI, called DesiredQoI. The parameters may also be specified in a format understood by both the gateway node and the individual computing nodes. Once the Desired QoI is defined, the gateway node then broadcasts this initial set of parameters in a specification request (step 304). Responsive to the broadcast, the gateway node receives and observes the values reported from the set of available sensors (step 306).

When the gateway node receives sensor data values from the sensors, the gateway node uses the sensor data values to compute the actual observed QoI value, or DataQoI (step 308). A comparison is then made as to whether the DataQoI and the DesiredQoI are "close enough" (i.e., within a range specified by the application) (step 310). If the two values fall within a specified acceptable range, the application does not attempt to modify the current parametric settings. Instead, the application returns to step 304 and re-broadcasts the present settings, especially if the model assumes a timeout value for all broadcasts after which the settings become invalid. If the comparison of the two QoI values does not fall within a specified acceptable range, the gateway node modifies the values of parameters (step 312), and returns to step 302 to incorporate these modified parameters in future requests. The gateway node may modify the parameters based on past divergence, parameters specified in past specification broadcasts, or actual values of computed quality of information and desired quality of information, or a combination thereof.

FIG. 4 is a flowchart of an exemplary process at an individual sensor to utilize the specification broadcasts and locally adapt its behavior. The process described in FIG. 4 may be implemented in a sensor node, such as sensor nodes 102-106 in FIG. 1.

The process begins with each sensor waiting to receive the specification broadcasts, which may be broadcast at appropriately defined intervals or based on a scheduled known a-priori to both the gateway node and the sensors (step 402). Upon receiving the broadcast, each sensor node first determines if it should process the broadcast by verifying that the node is a legitimate recipient of this broadcast (step 404). This verification may be performed by ensuring that the attributes of the sensor node satisfy the predicates contained in the broadcast request. The predicates specify attributes that are used to identify sensor nodes that are candidate targets of the broadcast. For example, if the predicates in the specification broadcast indicates that the broadcast is applicable to region A, the sensor node will only process the broadcast if the node is currently in region A. If the sensor is indeed a legitimate recipient of this broadcast, then the sensor node uses the specification parameters in the broadcast to adjust its own state (step 406). The sensor may adjust its behavior in a memoryless fashion, wherein adjustment is based purely on values of parameters in a current specification request. Alternatively, the sensor may adjust its behavior in a memory-based fashion, wherein adjustment is based on one of values in past specification requests and current or past behavioral attributes of the individual computing node. Adjustments may take a variety of forms and depend largely on the capabilities of sensor nodes and the types of parameters that are included in the specification broadcast. For example, if the parameter is an activation probability, then each sensor will choose to remain in an active state (sending back data samples at the specified periodicity) with this probability. Alternatively, if the parameter specifies a "zoom factor" for camera sensors, then each such sensor will set its zoom factor to the specified value.

Once the adaptation has been completed, each sensor node behaves according to its new state (step 408). For instance, the node may generate data if it is active, or remain asleep if it is inactive. The node remains in this new state until a subsequent specification broadcast request is received.

Turning back to step 404, if the predicates in the broadcast are not satisfied by the sensor node, the node takes no action to adapt its behavior, at least until the next broadcast request is received, and returns to step 402.

FIG. 5 shows example contents of a specification broadcast. In this illustrative example, it is assumed that the broadcast is structured as an XML document, identifying various parameters as part of the query. Broadcast request 500 may comprise various fields as shown, including ID 502, sequence 504, type 506, region 508, period 510, samestream 512, duration 514, and activation probability (psrp) 516. ID 502 represents the number of the particular broadcast query. ID 502 is principally used along with the sequence 504 attribute to order the set of broadcasts to make sure that nodes only process more recently issued broadcasts and not staler ones (since there is a possibility that the requests may get re-ordered in the actual communication process), as well as to make sure that nodes always switch to memoryless adaptation whenever the ID value is incremented (i.e., when another specification broadcast is issued). Sequence field 504 represents the iteration of the particular broadcast query for ID 502. Type field 506 comprises the type of sensor to which the request is directed. For instance, type field 506 shows the request is for thermal nodes. Likewise, region field 508 further qualifies the designated rectangular grid to which the request is directed. Period field 510 indicates the frequency of which the sensor reports data to the gateway node (e.g., each sensor will generate a sample every 30 seconds), while duration field 514 indicates the length of time each active sensor should generate this data (e.g., a total time of 600 seconds).

In addition, psrp field 516 is used in this example to illustrate the use of activation probability for activating only a subset of nodes. For instance, each node independently switches to an active (data generating and reporting) state with probability 0.6. Samestream field 512 is used to provide memory in the activation process. For example, if the value in samestream field 512 equals 1, then all nodes that are currently active do not perform the probabilistic activation, but remain active; only nodes currently inactive switch to active state with this probability. Conversely, if the value equals 0, then all nodes, irrespective of their current state, will re-compute their inactive or active state with the designated probability. However, the samestream field does not apply if ID 502 changes. A change in ID indicates a completely new application QoI requirement, so the entire adaptation process is re-started without any past history. It should be noted that a variety of other probabilistic and deterministic attributes may be specified in generic specification requests.

Figure 6:
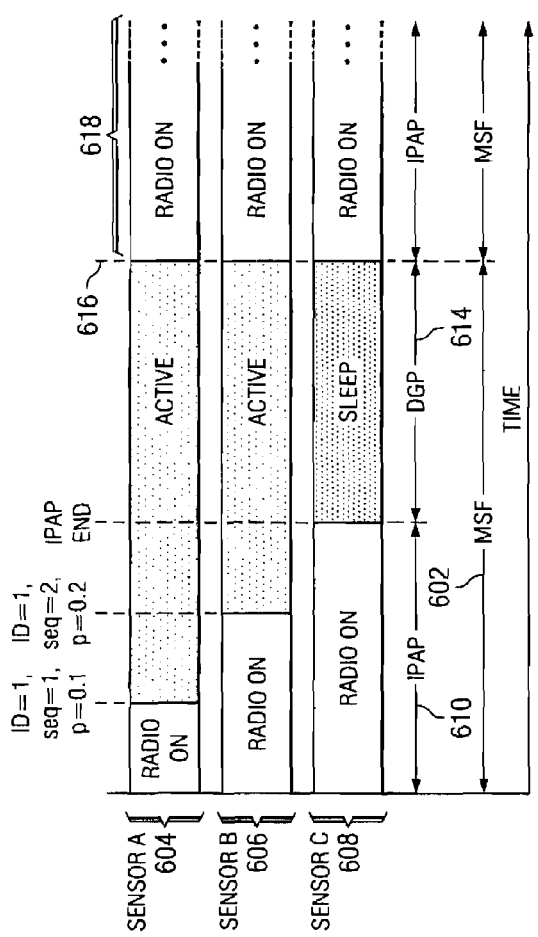
FIG. 6 shows an exemplary frame-based technique for allowing inactive sensor nodes to sleep in accordance with a preferred embodiment of the present invention.

One issue regarding sending requests to sensor nodes relates to how "inactive" nodes learn of new specification requests, and thus perform the necessary adaptation based on the request. These "inactive" nodes are presumably sleeping with their radio nodes turned off. FIG. 6 shows an exemplary frame-based technique for allowing inactive sensor nodes to sleep in accordance with a preferred embodiment of the present invention. In particular, FIG. 6 shows one exemplary way in which probabilistic activation can be achieved even when inactive nodes "sleep" for most of the time.

In this illustrative example, overall time 600 is divided into well-known frames of possibly varying duration called Macro Signaling Frames (MSF) 602. Within each MSF 602, all of the sensor nodes, such as sensors A 604, B 606, and C 608, are initially awake and listening for specification requests. During an initial period of time called initial probability adjustment phase (IPAP) 610, the gateway node repeatedly uses the control loop shown in FIG. 3 to adjust the activation probability values until the target QoI objective is met. Thus, during this phase, nodes that become active (e.g., sensors A 604 and B 606) send data at the designated frequency, and the gateway node adjusts the parameters of subsequent specification requests based on the QoI computed from this data.

Once the adaptation phase is over, the gateway node sends a special message indicating the end of the IPAP 610 and specifying the duration of an ensuing data gathering phase (DGP) 614. During DGP 614, no further specification requests are sent, inactive nodes sleep (e.g. sensor C 608), and the active nodes continue to send data at the designated frequency (e.g., sensors A 604 and B 606). While DGP 614 may slow down the responsiveness of the adaptation process to sudden changes in the sensor network (no change is possible during the DGP), the DGP offers potentially substantial energy savings in redundant environments by allowing inactive nodes to sleep. At the end 616 of the DGP, all nodes return to an "awake" state 618, and the adaptation process may begin again.

Figure 7:
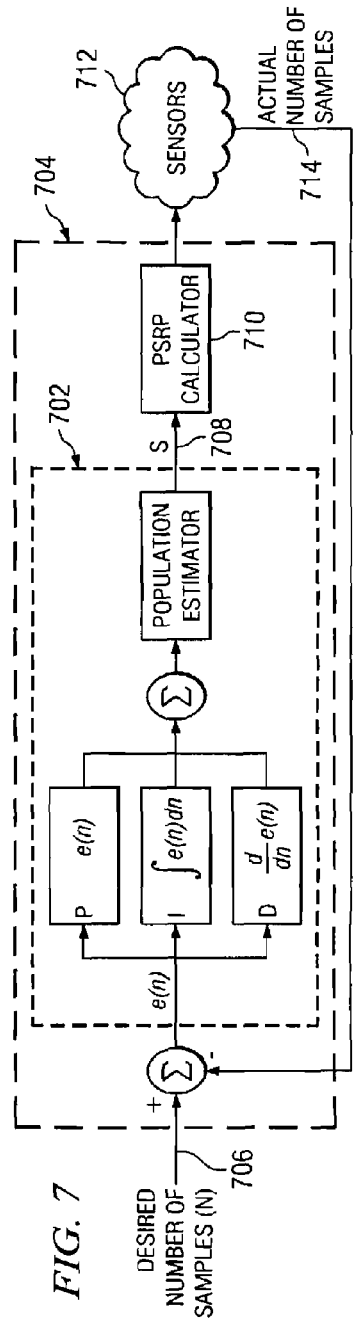
FIG. 7 shows a PID controller-based computation of activation probability in accordance with a preferred embodiment of the present invention.

As previously mentioned, there are many ways in which the gateway node may apply control-theoretic techniques to adjust the parameters of subsequent specification requests, based on the desired QoI value, the currently observed QoI value, and possibly the history of past parameter adjustments. For the sake of illustration, FIG. 7 shows one way in which the well-known Proportional-Integral-Derivative (PID) control technique is used to adjust the activation probability (psrp) broadcast in specification requests. In this example, the PID controller 702 runs within gateway node 704. If we assume that input to the gateway node is the number of distinct sensors needed N 706, the PID process first calculates, based on the difference between the number of observed samples, initially 0, and N, an "estimate" of the actual number of sensors deployed S 708. It should be noted that S 708 is only an estimate of the actual number of sensors, the actual number always remaining unknown to the gateway node.

Based on this estimated number of sensors (S 708) and the desired number of sensors (N 706), psrp calculator 710 may simply compute the activation probability (psrp) as N/S. This activation probability is then broadcast to sensors 712 in subsequent specification requests. The resultant number of reporting sensors is fed back 714 to the input of PID controller 702.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method for continually controlling collective behavior of a variable set of sensor nodes in a sensor network, the method comprising:

disseminating a first broadcast message from a gateway node comprising an initial specification request to the set of sensor nodes in the sensor network, wherein the initial specification request comprises a set of parameters and predicates, wherein the set of parameters specify a desired quality of information, a duration of time, a frequency of notification, and a sensor activation probability value of an individual sensor node to automatically perform a requested behavior, wherein the predicates of the specification request specify attributes of sensor nodes that are candidate targets of the specification request, and wherein the gateway node is unaware of a number and identity of individual sensor nodes in the set of sensor nodes;

responsive to a number of sensor nodes in the set of sensor nodes automatically performing the requested behavior according to the sensor activation probability value in the initial specification request, observing data communicated from the set of sensor nodes, wherein a computed quality of information value representing a collective behavior of the set of sensor nodes is calculated for the set of sensor nodes using the data; and responsive to a determination that the computed quality of information is not within a desired range of the desired quality of information, iteratively modifying a subsequent set of parameters comprising new sensor activation probability values disseminated in subsequent specification requests based on a divergence between the computed quality of information value and the desired quality of information value, wherein the predicates of the subsequent specification requests are used to determine a subset of the set of sensor nodes, wherein an individual sensor node in the subset of the set of sensor nodes adjusts its individual behavior based on the new sensor activation probability values disseminated in the subsequent specification requests, wherein the computed quality of information value is re-calculated for each subsequent specification request comprising new sensor activation probability values until adjustments in individual behaviors of the subset of the set of sensor nodes allow the computed quality of information values representing the collective behavior of the set of sensor nodes to satisfy the desired quality of information value, wherein the iteratively modifying step further comprises using a control theory technique to compute the subsequent set of parameters disseminated in the subsequent specification request.

2. The method of claim 1, wherein the disseminating step further comprises:

specifying the set of parameters and their values in a format understood by both the gateway node and the individual sensor nodes.

3. The method of claim 1, wherein the disseminating step further comprises:

using a point-to-multipoint packet distribution technique, wherein the point-to-multipoint packet distribution technique includes one of directed diffusion, multicasting, and broadcasting, and wherein the point-to-multipoint packet distribution technique routes each specification request to only those sensor nodes whose attributes satisfy the predicates contained in that specification request.

4. The method of claim 1, wherein the observing step further comprises:
   receiving data samples requested from the set of sensor nodes, wherein the set of sensor nodes send data samples for the duration of time using the frequency of notification; and
   applying an appropriate function to calculate the computed quality of information value.

5. The method of claim 1, wherein the observing step further comprises:
   requesting one or more data sample receivers to calculate and return the computed quality of information value to the gateway node.

6. The method of claim 1, wherein the iteratively modifying step further comprises:
   modifying the subsequent set of parameters disseminated in the subsequent specification request based on a combination of a past divergence, parameters specified in past specification broadcasts, and actual values of computed quality of information and desired quality of information.

7. The method of claim 1, wherein the control theory technique comprises one of proportional-integral-derivative control, fuzzy control, or sliding window control.

8. The method of claim 1, wherein the individual sensor node modifies its behavior by adjusting its behavior in one of a memoryless fashion, wherein adjustment is based on values of parameters in a current specification request, and in a memory-based fashion, wherein adjustment is based on one of values in past specification requests and current or past behavioral attributes of the individual sensor node.

9. The method of claim 1, wherein the desired quality of information comprises data received by the gateway node from a defined number of sensor nodes.

10. The method of claim 1, wherein the requested behavior includes at least one of a sensing behavior or a communication behavior.

11. The method of claim 1, further comprising:
    observing data communicated from sensor nodes in an active mode;
    responsive to determining that the computed quality of information data for sensor nodes in an active mode is less than the desired quality of information, increasing the sensor activation probability value of the sensor activation probability in a subsequent specification request; and
    responsive to determining that the computed quality of information data for sensor nodes in an active mode is greater than the desired quality of information, decreasing the sensor activation probability value of the sensor activation probability in a subsequent specification request.

12. A computer program product in a computer readable storage device having instructions embodied therein for continually controlling the collective behavior of a variable set of sensor nodes in a sensor network comprising:
    first instructions for disseminating a first broadcast message from a gateway node comprising an initial specification request to the set of sensor nodes in the sensor network, wherein the initial specification comprises a set of parameters and predicates, wherein the set of parameters specify a desired quality of information, a duration of time, a frequency of notification, and a sensor activation probability value of an individual sensor node to automatically perform a requested behavior, wherein the predicates of the specification request specify attributes of sensor nodes that are candidate targets of the specification request, and wherein the gateway node is unaware of a number and identity of individual sensor nodes in the set of sensor nodes;
    second instructions for observing data communicated from the set of sensor nodes in response to a number of sensor nodes in the set of sensor nodes automatically performing the requested behavior according to the sensor activation probability value in the initial specification request, wherein a computed quality of information value representing a collective behavior of the set of sensor nodes is calculated for the set of sensor nodes using the quality of information data; and
    third instructions for iteratively modifying a subsequent set of parameters comprising new sensor activation probability values disseminated in subsequent specification requests based on a divergence between the computed quality of information value and the desired quality of information value in response to a determination that the computed quality of information is not within a desired range of the desired quality of information, wherein the predicates of the subsequent specification requests are used to determine a subset of the set of sensor nodes, wherein an individual computing node in the subset of the set of sensor nodes adjusts its individual behavior based on the new sensor activation probability values disseminated in the subsequent specification requests, wherein the computed quality of information value is re\-calculated for each subsequent specification request comprising new sensor activation probability values until adjustments in individual behaviors of the subset of the set of sensor nodes allow the computed quality of information values representing the collective behavior of the set of sensor nodes to satisfy the desired quality of information value, wherein the third instructions for iteratively modifying further comprises instructions for using a control theory technique to compute the subsequent set of parameters disseminated in the subsequent specification request.

13. The computer program product of claim 12, wherein the second instructions for observing further comprises:
    instructions for receiving data samples requested from the set of sensor nodes, wherein the set of sensor nodes send data samples for the duration of time using the frequency of notification; and
    instructions for applying an appropriate function to calculate the computed quality of information value.

14. The computer program product of claim 12, wherein the third instructions for iteratively modifying further comprises:
    instructions for modifying the subsequent set of parameters disseminated in the subsequent specification request based on a combination of a past divergence, parameters specified in past specification broadcasts, and actual values of computed quality of information and desired quality of information.

15. The computer program product of claim 12, wherein the third instructions for iteratively modifying further comprises:
    instructions for using a control theory technique to compute the subsequent set of parameters disseminated in the subsequent specification request, wherein the control theory technique comprises one of proportional-integral-derivative control, fuzzy control, or sliding window control.

16. The computer program product of claim 12, wherein the desired quality of information comprises data received by the gateway node from a defined number of sensor nodes.

17. The computer program product of claim 12, wherein the requested behavior includes at least one of a sensing behavior or a communication behavior.

18. The computer program product of claim 12, further comprising:
fourth instructions for responsive to determining that the computed quality of information data for sensor nodes in an active mode is less than the desired quality of information, increasing the sensor activation probability value of a sensor activation probability in a subsequent specification request; and
fifth instructions for responsive to determining that the computed quality of information data for sensor nodes in an active mode is greater than the desired quality of information, decreasing the sensor activation probability value of the sensor activation probability in a subsequent specification request.

19. A distributed data processing system for continually controlling the collective behavior of a variable set of sensor nodes in a sensor network, comprising:
a gateway node; and a set of computing devices connected to the gateway node;
wherein the gateway node disseminates a first broadcast message comprising an initial specification request to the set of sensor nodes, wherein the specification request comprises a set of parameters and predicates, wherein the set of parameters specify a desired quality of information, a duration of time, a frequency of notification, and a sensor activation probability value of an individual sensor node to automatically perform a requested behavior, wherein the predicates of the specification request specify attributes of sensor nodes that are candidate targets of the specification request, and wherein the gateway node is unaware of a number and identity of individual sensor nodes in the set of sensor nodes;
wherein the gateway node observes data communicated from the set of sensor nodes in response to receiving the initial specification request, wherein the gateway node calculates a computed quality of information value representing a collective behavior of the set of sensor nodes using the data; and
wherein the gateway node iteratively modifies a subsequent set of parameters comprising new sensor activation probability values disseminated in subsequent specification requests based on a divergence between the computed quality of information value and the desired quality of information value in response to a determination that the computed quality of information is not within a desired range of the desired quality of information, wherein the predicates of the subsequent specification requests are used to determine a subset of the set of sensor nodes, wherein an individual sensor node in the subset of the set of sensor nodes adjusts its individual behavior based on the new sensor activation probability values disseminated in the subsequent specification requests, and wherein the computed quality of information value is re-calculated for each subsequent specification request comprising new sensor activation probability values until adjustments in individual behaviors of the subset of the set of sensor nodes allow the computed quality of information values representing the collective behavior of the set of sensor nodes to satisfy the desired quality of information value, wherein iteratively modifying a subsequent set of parameters further comprises using a control theory technique to compute the subsequent set of parameters disseminated in the subsequent specification request.

20. The distributed data processing system of claim 19, wherein observing the data further comprises receiving data samples requested from the set of sensor nodes, wherein the set of sensor nodes send data samples for the duration of time using the frequency of notification, and applying an appropriate function to calculate the computed quality of information value.

21. The distributed data processing system of claim 19, wherein iteratively modifying a subsequent set of parameters disseminated in the subsequent specification request further comprises iteratively modifying the subsequent set of parameters based on a combination of a past divergence, parameters specified in past specification broadcasts, and actual values of computed quality of information and desired quality of information.

22. The distributed data processing system of claim 19, wherein iteratively modifying a subsequent set of parameters further comprises using a control theory technique to compute the subsequent set of parameters disseminated in the subsequent specification request, wherein the control theory technique comprises one of proportional-integral-derivative control, fuzzy control, or sliding window control.

23. The distributed data processing system of claim 19, wherein the desired quality of information comprises data received by the gateway node from a defined number of sensor nodes.

24. The distributed data processing system of claim 19, wherein the requested behavior includes at least one of a sensing behavior or a communication behavior.

25. The distributed data processing system of claim 19, further comprising:
wherein the gateway node increases the sensor activation probability value of a sensor activation probability in a subsequent specification request in response to the gateway node determining that the computed quality of information data for sensor nodes in an active mode is less than the desired quality of information; and
wherein the gateway node decreases the sensor activation probability value of the sensor activation probability in a subsequent specification request in response to the gateway node determining that the computed quality of information data for sensor nodes in an active mode is greater than the desired quality of information.

* * * * *